US011437020B2

(12) United States Patent
Prémont et al.

(10) Patent No.: US 11,437,020 B2
(45) Date of Patent: Sep. 6, 2022

(54) TECHNIQUES FOR SPATIALLY SELECTIVE WAKE-UP WORD RECOGNITION AND RELATED SYSTEMS AND METHODS

(71) Applicant: CERENCE OPERATING COMPANY, Burlington, MA (US)

(72) Inventors: Julien Prémont, Neu-Ulm (DE); Tim Haulick, Blaubeuren (DE); Emanuele Dalmasso, Moncaliero (IT); Munir Nikolai Alexander Georges, Kehl (DE); Andreas Kellner, Herzogenrath (DE); Gaetan Martens, Geraardsbergen (DE); Oliver Van Porten, Roetgen (DE); Holger Quast, Merelbeke (DE); Martin Roessler, Ulm (DE); Tobias Wolff, Neu-Ulm (DE); Markus Buck, Biberach (DE)

(73) Assignee: CERENCE OPERATING COMPANY, Burlington, MA (US)

( * ) Notice: Subject to any disclaimer, the term of this patent is extended or adjusted under 35 U.S.C. 154(b) by 0 days.

(21) Appl. No.: 16/074,953

(22) PCT Filed: Feb. 10, 2016

(86) PCT No.: PCT/US2016/017317
§ 371 (c)(1),
(2) Date: Aug. 2, 2018

(87) PCT Pub. No.: WO2017/138934
PCT Pub. Date: Aug. 17, 2017

(65) Prior Publication Data
US 2019/0073999 A1    Mar. 7, 2019

(51) Int. Cl.
*G10L 15/08*    (2006.01)
*G10L 15/32*    (2013.01)
*G10L 21/0216*  (2013.01)

(52) U.S. Cl.
CPC .............. *G10L 15/08* (2013.01); *G10L 15/32* (2013.01); *G10L 2015/088* (2013.01); *G10L 2021/02166* (2013.01)

(58) Field of Classification Search
CPC ....... G10L 15/08; G10L 15/22; G10L 15/265; G10L 15/30
See application file for complete search history.

(56) References Cited

U.S. PATENT DOCUMENTS 5,428,707 A   6/1995 Gould et al.
5,774,859 A   6/1998 Houser et al.
(Continued)

FOREIGN PATENT DOCUMENTS

CN   101650943 A   2/2010
CN   103021409 A   4/2013
(Continued)

OTHER PUBLICATIONS

International Search Report and Written Opinion for International Application No. PCT/US2016/017317 dated May 12, 2016.
(Continued)

*Primary Examiner* — Paras D Shah
(74) *Attorney, Agent, or Firm* — Brooks Kushman, P.C.

(57) ABSTRACT

According to some aspects, a system for detecting a designated wake-up word is provided, the system comprising a plurality of microphones to detect acoustic information from a physical space having a plurality of acoustic zones, at least one processor configured to receive a first acoustic signal representing the acoustic information received by the plurality of microphones, process the first acoustic signal to identify content of the first acoustic signal originating from each of the plurality of acoustic zones, provide a plurality of second acoustic signals, each of the plurality of second acoustic signals substantially corresponding to the content
(Continued)

identified as originating from a respective one of the plurality of acoustic zones, and performing automatic speech recognition on each of the plurality of second acoustic signals to determine whether the designated wake-up word was spoken.

20 Claims, 8 Drawing Sheets

(56) References Cited

U.S. PATENT DOCUMENTS

| | | | |
|---|---|---|---|
| 5,802,305 A | 9/1998 | McKaughan et al. | |
| 5,983,186 A | 11/1999 | Miyazawa et al. | |
| 6,006,175 A | 12/1999 | Holzrichter | |
| 6,070,140 A | 5/2000 | Tran | |
| 6,092,043 A | 7/2000 | Squires et al. | |
| 6,397,186 B1 | 5/2002 | Bush et al. | |
| 6,408,396 B1 | 6/2002 | Forbes | |
| 6,411,926 B1 | 6/2002 | Chang | |
| 6,449,496 B1 | 9/2002 | Beith et al. | |
| 6,594,630 B1 | 7/2003 | Zlokarnik et al. | |
| 6,756,700 B2 | 6/2004 | Zeng | |
| 6,859,776 B1 | 2/2005 | Cohen et al. | |
| 6,941,265 B2 | 9/2005 | Bi et al. | |
| 6,965,786 B2 | 11/2005 | Qu et al. | |
| 7,114,090 B2 | 9/2006 | Kardach et al. | |
| 7,567,827 B2 | 7/2009 | Kim | |
| 7,574,361 B2 | 8/2009 | Yeager et al. | |
| 7,720,683 B1 | 5/2010 | Vermeulen et al. | |
| 7,774,204 B2 | 8/2010 | Mozer et al. | |
| 8,056,070 B2 | 11/2011 | Goller et al. | |
| 8,181,046 B2 | 5/2012 | Marcu et al. | |
| 8,190,420 B2 | 5/2012 | Kadirkamanathan et al. | |
| 8,285,545 B2 | 10/2012 | Lee et al. | |
| 8,548,176 B2 | 10/2013 | Bright | |
| 8,620,389 B2 | 12/2013 | Schrager | |
| 8,666,751 B2 | 3/2014 | Murthi et al. | |
| 8,977,255 B2 | 3/2015 | Freeman et al. | |
| 9,087,520 B1 | 7/2015 | Salvador | |
| 9,112,984 B2 | 8/2015 | Sejnoha et al. | |
| 9,293,151 B2 | 3/2016 | Herbig et al. | |
| 9,361,885 B2 | 6/2016 | Ganong, III et al. | |
| 9,558,749 B1 | 1/2017 | Seeker-Walker et al. | |
| 9,646,610 B2 | 5/2017 | Macho | |
| 9,747,899 B2 | 8/2017 | Pogue et al. | |
| 9,940,936 B2 | 4/2018 | Sejnoha et al. | |
| 9,992,642 B1 | 6/2018 | Rapp et al. | |
| 10,057,421 B1 | 8/2018 | Chiu et al. | |
| 10,332,525 B2 | 6/2019 | Seeker-Walker et al. | |
| 2002/0193989 A1* | 12/2002 | Geilhufe | G10L 15/26 704/208 |
| 2003/0040339 A1 | 2/2003 | Chang | |
| 2003/0120486 A1 | 6/2003 | Brittan et al. | |
| 2003/0216909 A1 | 11/2003 | Davis et al. | |
| 2007/0129949 A1 | 6/2007 | Alberth, Jr. et al. | |
| 2008/0118080 A1* | 5/2008 | Gratke | B60R 16/0373 381/86 |
| 2009/0055178 A1* | 2/2009 | Coon | B60R 16/0373 704/246 |
| 2009/0228281 A1* | 9/2009 | Singleton | G01C 21/3608 704/275 |
| 2010/0009719 A1 | 1/2010 | Oh et al. | |
| 2010/0121636 A1 | 5/2010 | Burke et al. | |
| 2010/0124896 A1 | 5/2010 | Kumar | |
| 2010/0185448 A1 | 7/2010 | Meisel | |
| 2010/0289994 A1 | 11/2010 | Nonaka | |
| 2011/0054899 A1 | 3/2011 | Phillips et al. | |
| 2012/0004904 A1 | 2/2012 | LeBeau et al. | |
| 2012/0035924 A1 | 2/2012 | Jitkoff et al. | |
| 2012/0127072 A1 | 5/2012 | Kim | |
| 2012/0197637 A1* | 8/2012 | Gratke | G10L 21/02 704/226 |
| 2012/0281885 A1 | 11/2012 | Syrdal et al. | |
| 2012/0310646 A1 | 12/2012 | Hu et al. | |
| 2012/0329389 A1 | 12/2012 | Royston et al. | |
| 2013/0080167 A1 | 3/2013 | Mozer | |
| 2013/0080171 A1 | 3/2013 | Mozer et al. | |
| 2013/0289994 A1 | 10/2013 | Newman et al. | |
| 2013/0339028 A1 | 12/2013 | Rosner et al. | |
| 2014/0012573 A1 | 1/2014 | Hung et al. | |
| 2014/0012586 A1 | 1/2014 | Rubin et al. | |
| 2014/0039888 A1* | 2/2014 | Taubman | H04M 1/72572 704/235 |
| 2014/0163978 A1 | 6/2014 | Basye et al. | |
| 2014/0249817 A1 | 9/2014 | Hart et al. | |
| 2014/0274203 A1 | 9/2014 | Ganong, III et al. | |
| 2014/0274211 A1 | 9/2014 | Sejnoha et al. | |
| 2014/0278435 A1 | 9/2014 | Ganong, III et al. | |
| 2014/0365225 A1 | 12/2014 | Haiut | |
| 2015/0006176 A1 | 1/2015 | Pogue et al. | |
| 2015/0053779 A1* | 2/2015 | Adamek | F24F 11/30 236/1 C |
| 2015/0106085 A1 | 4/2015 | Lindahl | |
| 2015/0340042 A1 | 11/2015 | Sejnoha et al. | |
| 2016/0039356 A1* | 2/2016 | Talwar | H04R 3/00 381/86 |
| 2016/0078869 A1 | 3/2016 | Syrdal et al. | |
| 2016/0125882 A1* | 5/2016 | Contolini | G10L 15/20 704/231 |
| 2016/0189706 A1 | 6/2016 | Zopf et al. | |
| 2016/0196832 A1* | 7/2016 | Maxon | G10K 11/1754 704/201 |
| 2016/0284350 A1* | 9/2016 | Yun | G06F 3/167 |
| 2016/0314782 A1* | 10/2016 | Klimanis | G10L 15/065 |
| 2016/0322044 A1* | 11/2016 | Jung | H04L 67/12 |
| 2016/0358605 A1 | 12/2016 | Ganong et al. | |
| 2017/0116983 A1* | 4/2017 | Furukawa | G10L 15/20 |
| 2017/0188437 A1* | 6/2017 | Banta | G10L 15/30 |
| 2018/0114531 A1 | 4/2018 | Kumar et al. | |
| 2018/0130468 A1 | 5/2018 | Pogue et al. | |
| 2018/0158461 A1 | 6/2018 | Wolff et al. | |
| 2018/0182380 A1 | 6/2018 | Fritz et al. | |
| 2018/0310144 A1 | 10/2018 | Rapp et al. | |
| 2018/0366114 A1 | 12/2018 | Anbazhagan et al. | |
| 2019/0287526 A1 | 9/2019 | Ren et al. | |
| 2019/0311715 A1 | 10/2019 | Pfeffinger et al. | |
| 2019/0355365 A1 | 11/2019 | Kim et al. | |
| 2020/0035231 A1 | 1/2020 | Parthasarathi et al. | |
| 2021/0158822 A1* | 5/2021 | Stekkelpak | G10L 15/22 |

FOREIGN PATENT DOCUMENTS

| | | |
|---|---|---|
| CN | 103632668 A | 3/2014 |
| CN | 104575504 A | 4/2015 |
| CN | 105009204 A | 10/2015 |
| CN | 105575395 A | 5/2016 |
| CN | 106098059 A | 11/2016 |
| EP | 1511010 | 3/2005 |
| EP | 2899955 A1 | 7/2015 |
| EP | 2932500 B1 | 2/2017 |
| WO | WO 2014/066192 A1 | 5/2014 |

OTHER PUBLICATIONS

International Preliminary Report on Patentability for International Application No. PCT/US2016/017317 dated Aug. 23, 2018.
Chinese Office Action and Translation thereof for Chinese Application No. 201480013903.1 dated Jul. 28, 2017.
International Preliminary Report on Patentability for International Application No. PCT/US2014/024270 dated Sep. 24, 2015.
International Preliminary Report on Patentability for International Application No. PCT/US2016/037495 dated Dec. 27, 2018.
International Preliminary Report on Patentability for International Application No. PCT/CN2016/105343 dated May 23, 2019.
International Search Report and Written Opinion for International Application No. PCT/US2014/024270 dated Jun. 16, 2014.
International Search Report and Written Opinion for International Application No. PCT/CN2016/105343 dated Sep. 21, 2017.
International Search Report and Written Opinion for International Application No. PCT/US2016/037495 dated Dec. 5, 2016.

(56) References Cited

OTHER PUBLICATIONS

U.S. Appl. No. 13/795,933, filed Mar. 12, 2013, Ganong et al.
U.S. Appl. No. 13/795,960, filed Mar. 12, 2013, Ganong et al.
U.S. Appl. No. 14/814,192, filed Jul. 30, 2015, Sejnoha et al.
U.S. Appl. No. 15/238,238, filed Aug. 16, 2016, Ganong et al.
U.S. Appl. No. 16/348,689, filed May 9, 2019, Ren et al.
U.S. Appl. No. 16/308,849, filed Dec. 11, 2018, Pfeffinger et al.
CN 201480013903.1, dated Jul. 28, 2017, Office Action.
PCT/US2014/024270, dated Jun. 16, 2014, International Search Report and Written Opinion.
PCT/CN2016/105343, dated Sep. 21, 2017, International Search Report and Written Opinion.
PCT/CN2016/105343, dated May 23, 2019, International Preliminary Report on Patentability.
PCT/US2016/037495, dated Dec. 5, 2016, International Search Report and Written Opinion.
PCT/US2016/037495, dated Dec. 27, 2018, International Preliminary Report on Patentability.
PCT/US2016/017317, dated May 12, 2016, International Search Report and Written Opinion.
PCT/US2016/017317, dated Aug. 23, 2018, International Preliminary Report on Patentability.

* cited by examiner

TECHNIQUES FOR SPATIALLY SELECTIVE WAKE-UP WORD RECOGNITION AND RELATED SYSTEMS AND METHODS

BACKGROUND

Many systems and applications are presently speech enabled, allowing users to interact with the system via speech (e.g., enabling users to speak commands to the system). Engaging speech-enabled systems often requires users to signal to the system that the user intends to interact with the system via speech. For example, some speech recognition systems may be configured to begin recognizing speech once a manual trigger, such as a button push (e.g., a button of a physical device and/or a button within a speech recognition software application), launch of an application or other manual interaction with the system, is provided to alert the system that speech following the trigger is directed to the system. However, manual triggers complicate the interaction with the speech-enabled system and, in some cases, may be prohibitive (e.g., when the user's hands are otherwise occupied, such as when operating a vehicle, or when the user is too remote from the system to manually engage with the system or an interface thereof).

To address the inconvenience (and often inapplicability) of manual triggers, some speech-enabled systems allow for voice triggers to be spoken to begin engaging with the system, thus eliminating at least some (if not all) manual actions and facilitating generally hands-free access to the speech-enabled system. Use of a voice trigger may have several benefits, including greater accuracy by deliberately not recognizing speech not directed to the system, a reduced processing cost since only speech intended to be recognized is processed, less intrusive to users by only responding when a user wishes to interact with the system, and/or greater privacy since the system may only transmit or otherwise process speech that was uttered with the intention of the speech being directed to the system.

A voice trigger may comprise a designated word or phrase (e.g., "Hello Dragon") that is spoken by the user to indicate to the system that the user intends to interact with the system (e.g., to issue one or more commands to the system). Such voice triggers are also referred to herein as a "wake-up word" or "WuW" and refer to both single word triggers and multiple word triggers. Typically, once the wake-up word has been detected, the system begins recognizing subsequent speech spoken by the user. In most cases, unless and until the system detects the wake-up word, the system will assume that the acoustic input received from the environment is not directed to or intended for the system and will not process the acoustic input further. As such, it is important that a speech-enabled system be able to detect when a wake-up word has been uttered with a relatively high degree of accuracy.

SUMMARY

The present application generally relates to techniques for wake-up word recognition.

According to some aspects, a system for detecting a designated wake-up word is provided, the system comprising a plurality of microphones to detect acoustic information from a physical space having a plurality of acoustic zones, at least one processor configured to receive a first acoustic signal representing the acoustic information received by the plurality of microphones, process the first acoustic signal to identify content of the first acoustic signal originating from each of the plurality of acoustic zones, provide a plurality of second acoustic signals, each of the plurality of second acoustic signals substantially corresponding to the content identified as originating from a respective one of the plurality of acoustic zones, and performing automatic speech recognition on each of the plurality of second acoustic signals to determine whether the designated wake-up word was spoken.

According to some aspects, a method for detecting a designated wake-up word using a plurality of microphones configured to detect acoustic information within a physical space having a plurality of acoustic zones is provided, the method comprising receiving a first acoustic signal representing the acoustic information received by the plurality of microphones, processing the first acoustic signal to identify content of the first acoustic signal originating from each of the plurality of acoustic zones, providing a plurality of second acoustic signals, each of the plurality of second acoustic signals substantially corresponding to the content identified as originating from a respective one of the plurality of acoustic zones, and performing automatic speech recognition on each of the plurality of second acoustic signals to determine whether the designated wake-up word was spoken.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1:
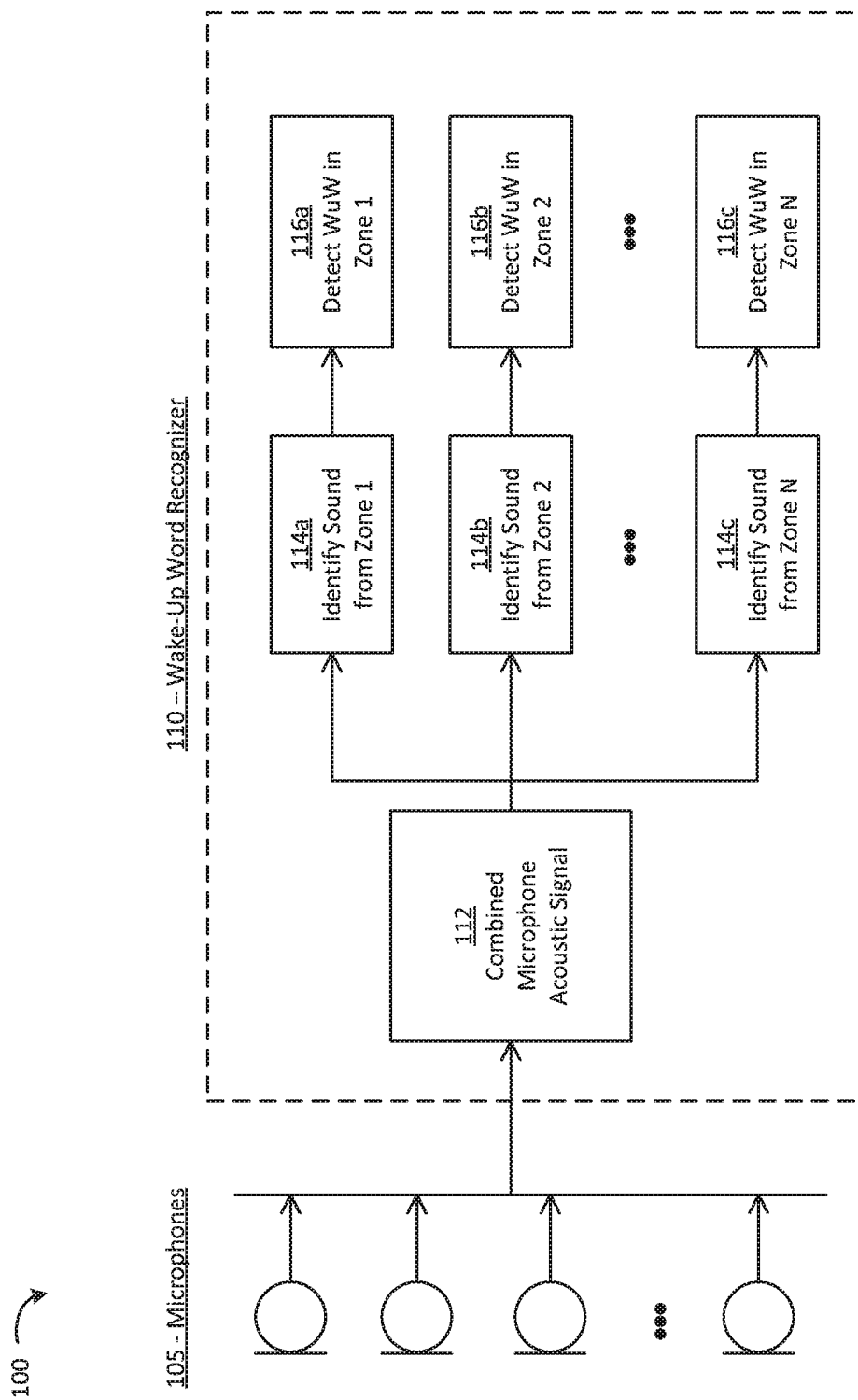
FIG. 1 is a block diagram of a system suitable for practicing aspects of the invention, according to some embodiments.

As discussed above, many speech enabled systems allow for generally hands free engagement via the use of voice triggers (e.g., spoken wake-up words). Since the wake-up word must in general be recognized before the system becomes responsive to the user (e.g., before the system will respond to further voice commands), it is desirable that the wake-up word be recognized with a high degree of accuracy. Both false positive and false negative rates that are too high lead to user frustration and annoyance and result in a system with unsatisfactory responsiveness.

The inventors have recognized that conventional systems often perform wake-up word detection unsatisfactorily, particularly in noisy environments and/or in environments where multiple speakers are talking simultaneously. In particular, in some environments there may be multiple sources of speech and/or other sounds in an environment, leading to difficulties in the ability of conventional systems to detect whether one of these sources includes a user speaking the wake-up word. Even if the wake-up word is detected in such an environment when produced by a particular user, it may also be difficult to identify subsequent speech from the user due to the other sounds present in the environment. For example, in a motor vehicle containing multiple passengers, one passenger may wish to provide voice commands to an in-vehicle system (e.g., to a navigation system, stereo system, etc.). The speech of the passenger wishing to provide voice commands may be hard to distinguish from voices of other passengers, engine noise, road noise, music playing in the car, etc., and consequently detection of the wake-up word from this passenger may be difficult or impossible for conventional systems. Conventionally, a passenger wishing to provide voice commands in a vehicle may have to secure a relatively quiet environment before attempting to interact with the system. Moreover, in some vehicle systems, the microphone may be placed close to the driver's seat of the vehicle, which may further compound the difficulty of a passenger in the passenger seat and/or seated in a rear seat to successfully interact with the system via speech.

The inventors have developed techniques for improved wake-up word detection by selectively processing acoustic information to identify sound originating from selected regions of space and separately performing speech recognition on the sound identified for each region. The spatial regions, referred to herein as "acoustic zones," correspond to spatial partitions of the space in which the system is deployed and configured to respond. The system may then process acoustic information detected from the space via one or more microphones to identify sound produced from each of the acoustic zones and, independently for each acoustic zone, determine whether a wake-up word was spoken within the acoustic zone.

In some embodiments, acoustic information from an environment that has been logically partitioned into a plurality of acoustic zones may be captured by multiple microphones (e.g., a microphone array) for which the spatial relationship between the microphones is known. Acoustic information captured by the multiple microphones may be compared, filtered or otherwise processed to identify from which acoustic zone captured sound originated. For example, any of various techniques including, but not limited to, time of flight, angle of arrival, differences in amplitude, beamforming and/or other spatial filtering techniques may be utilized to identify acoustic input originating from each of the plurality of acoustic zones. According to some embodiments, a spatial processing component is provided in association with each of the plurality of acoustic zones and is configured to identity and separate and/or isolate acoustic input originating from the respective acoustic zone, for example, using any one or combination of the above mentioned techniques.

The inventors have recognized that upon identification and separation/isolation of the acoustic input originating from each of the acoustic zones, wake-up word detection may be improved by separately recognizing the acoustic signal resulting from acoustic input originating from each respective acoustic zone. This may be achieved by providing a separate speech recognizer or separate instances of a speech recognizer to recognize the speech content of the acoustic signal arising from each of the acoustic zones. Alternatively, the same speech recognizer can recognize speech content in each respective acoustic signal in a serial fashion. The resulting recognition results may then be processed to determine whether a wake-up word was spoken in any of the acoustic zones and, if so, from which acoustic zone it was spoken. By recognizing the acoustic signals arising from each acoustic zone separately, improved wake-up word detection that is more robust to noise and multiple speakers may be achieved.

According to some embodiments, once a wake-up word has been detected as produced from within a given acoustic zone, a system may then preferentially target that zone for subsequent automatic speech recognition. For instance, the system may identify sound produced from that zone within sound signals received by one or more microphones and perform speech recognition on the identified sound. Such an approach may allow for more accurate speech detection in a noisy environment, such as those environments discussed above, since the system may perform speech recognition on sounds produced from the selected acoustic zone whilst excluding sounds produced from other acoustic zones.

For instance, returning to the motor vehicle example described above, the techniques described herein may allow a passenger in a rear seat to speak a wake-up word that is recognized by one or more microphones within the vehicle even though other sounds may be present in the environment, since an acoustic zone may be defined that includes the passenger's seat and sounds produced from within that acoustic zone may be targeted for wake-up word recognition. Moreover, once the wake-up word has been recognized as being produced from the rear seat passenger's acoustic zone, subsequent sounds produced from that acoustic zone may be used as input for automatic speech recognition. In this manner, a passenger's speech, including both a wake-up word and subsequent speech commands, may be recognized in an environment that includes other sound sources, even other sources of speech. As discussed above, using a separate speech recognizer or separate instances of a speech recognizer to recognize the speech content of the acoustic signal arising from each of the acoustic zones in particular provides more robust speech recognition in such an environment.

According to some embodiments, one or more hardware sensors may aid in detection of a wake-up word. Since a user must be present in an acoustic zone in order to produce speech (including a wake-up word) from within that acoustic zone, hardware sensors may be used to determine whether, in fact, a user is present in that acoustic zone. Such sensors may include any one or combination of motion sensors (e.g., to determine if any users are present in a room), pressure sensors (e.g., to determine if a user is sitting in a seat, such as a car seat), cameras to provide optical data, sensors to detect when a seat belt is engaged and/or any other suitable sensor(s) that facilitates determining whether there is a user located within an acoustic zone. If it is determined that no user is present in a particular acoustic zone, that acoustic zone need not be further considered during wake-up word detection and/or subsequent speech recognition by the system.

Following below are more detailed descriptions of various concepts related to, and embodiments of, techniques of wake-up word detection. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 is a block diagram of a system suitable for practicing techniques or detecting a wake-up word, according to some embodiments. System 100 depicts a wake-up word recognizer 110, which receives sound from a plurality of microphones 105. The wake-up word recognizer may include any suitable system capable of receiving signals representing received sound from the microphones and performing wake-up word recognition using the received signals, as described below. In some embodiments, wake-up word recognizer 110 may include a programmed general purpose computer, a configured custom circuit (e.g., an ASIC or FPGA), and/or combinations thereof that may be operated to perform one or more of the below-described steps of wake-up word recognition.

Microphones 105 may include any number and type of any suitable transducer(s) configured to convert acoustic waves into electrical signals. According to some embodiments, microphones 105 may include one or more sound pressure microphones, electret microphones, binaural microphones, MEMS microphones, or combinations thereof. However, it should be appreciated that any type of microphone in any combination may be used, as the aspects are not limited in this respect.

As discussed above, wake-up word recognition techniques may be performed by identifying sound produced from one or more acoustic zones, which are regions of space preselected to examine for wake-up word detection. Microphones 105 may be positioned within any number of acoustic zones, and each acoustic zone may include zero or more of the microphones 105. In some embodiments, one or more of microphones 105 are not located in any acoustic zone. According to some embodiments, the number of microphones is independent of the number of acoustic zones.

Microphones 105 may transmit acoustic signals (being electrical signals indicative of sound received by a respective microphone) to the wake-up word recognizer 110 via any suitable wired and/or wireless connections. In some embodiments, microphones 105 may be part of, or otherwise coupled to, a device which transmits an acoustic signal from the microphone to the wake-up word recognizer 110. For instance, one or more of microphones 105 may be part of a smart TV, and the TV may receive acoustic signals from the microphones and transmit acoustic signals to the wake-up word recognizer 110 via wired and/or wireless communication channels. However, such devices are not limited to smart TVs, and may include any devices with built in microphones, including but not limited to mobile phones, tablets, computers, smart watches, smart thermostats, gaming consoles, etc.

Unit 112 of the wake-up word recognizer 110 receives the acoustic signals from the microphones 105 and provides the received acoustic signals to units 114a, 114b, . . . , 114n which each identify sound from the combined set of acoustic signals as coming from a particular acoustic zone. According to some embodiments, unit 112 may perform any one or more post processing acoustic operations, including but not limited to: echo cancellation, level correction, denoising, equalization, or combinations thereof.

The number of units 114a, 114b, . . . , 114n corresponds to the number of acoustic zones that the wake-up word recognizer 110 is configured to analyze to identify whether a wake-up word was spoken. The units 114a, 114b, . . . , 114n analyze the received acoustic signals to identify, within those signals, portions of sound that were produced from the acoustic zone associated each respective unit 114a, 114b, . . . , or 114n. Each of units 114a, 114b, . . . , 114n may utilize knowledge of the relative locations of microphones 105 and their associated acoustic zone to identify those portions of sound produced from the associated acoustic zone. As such, the wake-up word recognizer may be configured to access (e.g., by accessing a computer readable storage medium) information about the acoustic zones and the microphones, including how many microphones are being used as input, where the microphones are located relative to the acoustic zones, and/or the size, shape and/or position of each acoustic zone.

According to some embodiments, units 114a, 114b, . . . , 114n may perform beamforming and/or other spatial filtering techniques on received acoustic signals to identify a direction from which a sound in the combined acoustic signals was received. By performing spatial filtering for multiple microphones of microphones 105, a position of a sound source in space may be identified (e.g., by triangulating sound vectors), and a determination may be made as to which acoustic zone the position is located within (or, as the case may be, a determination may be made that the position is not located within any of the acoustic zones).

In the example of FIG. 1, once each of units 114a, 114b, . . . , 114n have identified sounds produced from their respective acoustic zones, acoustic signals representing these sounds are each supplied to units 116a, 116b, . . . , 116n, respectively. Each of units 116a, 116b, . . . , 116n perform speech recognition on their received acoustic signals to identify whether a wake-up word was spoken within each respective acoustic zone. For instance, unit 116a may include an automatic speech recognition (ASR) model configured to analyze sound produced within an acoustic zone 1 and determine whether that sound includes utterance of a wake-up word; and unit 116b may include a different ASR model configured to analyze sound produced within acoustic zone 2 and determine whether that sound includes utterance of the wake-up word.

According to some embodiments, each of the units 116a, 116b, . . . , 116n may produce a measure (e.g., a confidence value) that the wake-up word was spoken within their associated acoustic zone and the wake-up word recognizer 110 may identify, from these measures, which acoustic zones are candidates for a valid wake-up word detection and/or which acoustic zone is the most likely candidate for a wake-up word detection. For example, each of units 116a, 116b, . . . , 116n may compare a confidence that the analyzed acoustic signal included utterance of a wake-up word with a threshold value above which detection of a wake-up word will be considered to have occurred. Since multiple acoustic zones may simultaneously detect a wake-up word, confidence values for those acoustic zones may be compared to determine which acoustic zone most likely produced the wake-up word.

According to some embodiments, one or more of the speech recognition models used by units 116a, 116b, . . . , 116n may have a grammar that includes only one or more wake-up words (or may be limited to those wake-up words in addition to a few additional words). Since the speech recognition models used by units 116a, 116b, . . . , 116n may be used solely to detect utterance of a wake-up word, to reduce processing overhead it may be desirable for the model to be substantially limited to detection of only the preselected wake-up word(s).

According to some embodiments, speech recognition models used by units 116a, 116b, ..., 116n may have different acoustic models. Each of the speech recognition models are used to each detect a wake-up word within one particular acoustic zone, and since each acoustic zone may exhibit a different acoustic environment, it may be beneficial to train the speech recognition models for the acoustic environment of their associated acoustic zones. For example, a system in which the acoustic zones are different rooms of a house may exhibit different acoustic environments in each room due to differences in background noise, shapes and sizes of the rooms and/or contents of the rooms. The speech recognition model associated with each acoustic zone may therefore be trained to recognize a wake-up word within the acoustic environment of the associated acoustic zone to improve recognition of the wake-up word.

Figure 2:
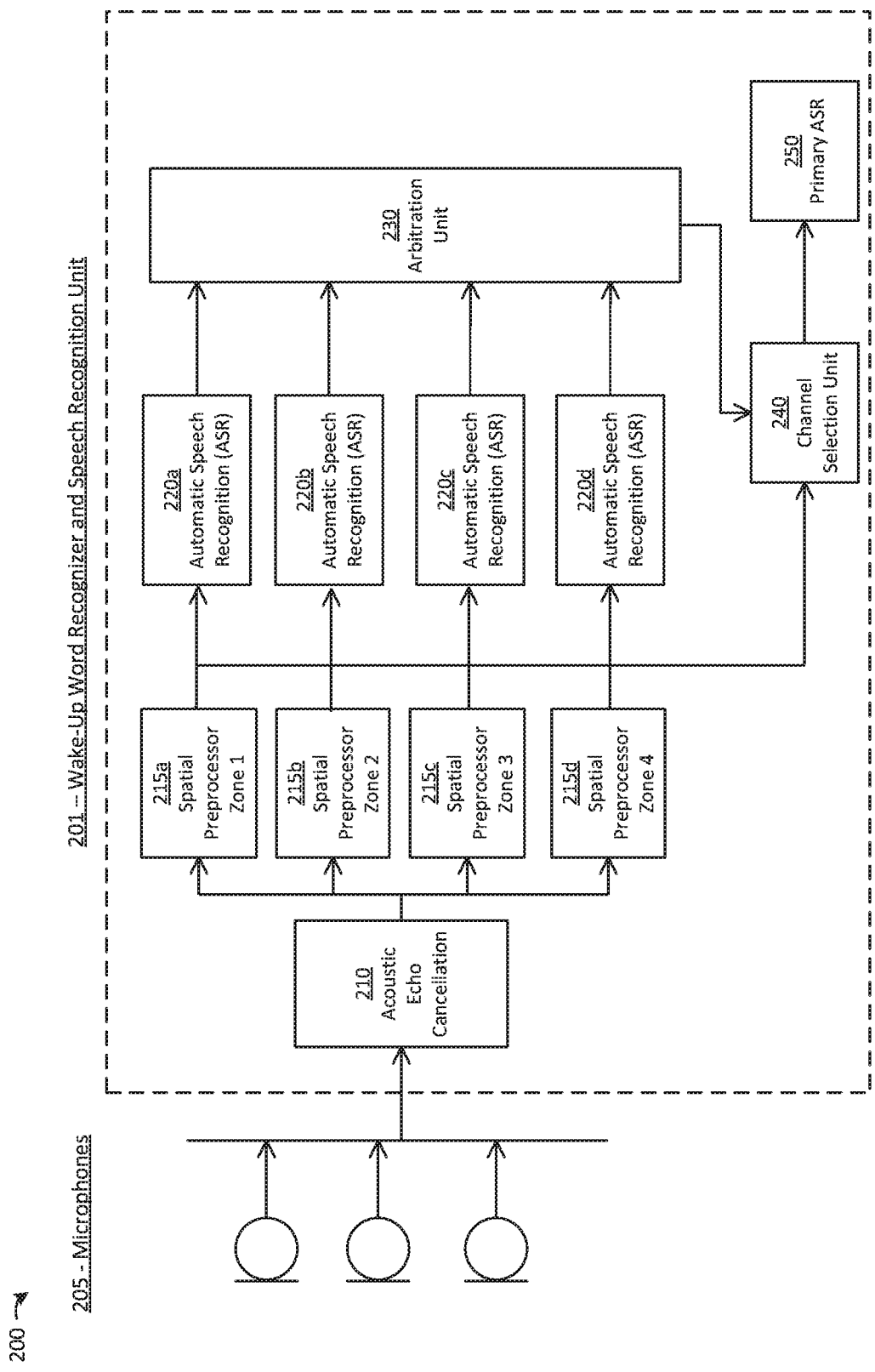
FIG. 2 is a block diagram of a wake-up word recognition system configured to recognize a wake-up word as being produced from an acoustic zone and to perform speech recognition of subsequent sound produced from that zone, according to some embodiments.

FIG. 2 is a block diagram of a wake-up word recognition system configured to recognize a wake-up word as being produced from an acoustic zone and to perform speech recognition of subsequent sound produced from that zone, according to some embodiments. In the example of FIG. 2, system 200 includes three microphones 205 used as input to a wake-up word recognizer and speech recognition unit 201. Also in the example of FIG. 2, four acoustic zones are considered and analyzed to determine whether sounds captured by the microphones 205 include utterance of a wake-up word, and if so, in which of the four acoustic zones the utterance occurred. In system 200, once the acoustic zone in which the wake-up word was uttered has been identified, that acoustic zone may be targeted to receive subsequent speech commands from a user. In some embodiments, wake-up word recognizer and speech recognition unit 201 may include a programmed general purpose computer, a configured custom circuit (e.g., an ASIC or FPGA), and/or combinations thereof, that may be operated to perform one or more of the below-described steps of wake-up word recognition.

In the example of FIG. 2, acoustic echo cancellation unit 210 receives acoustic signals from the microphones 205 and performs acoustic echo cancellation upon the received acoustic signals. The processed acoustic signals are thereafter provided to spatial preprocessors (SPPs) 215a-215d, which each analyze received acoustic signals to determine which sound from the received acoustic signals was produced from the acoustic zone associated with the spatial preprocessor (e.g., spatial preprocessor 215a identifies sound that was produced from within an acoustic zone 1, etc.). As discussed above, identifying the sound produced from an acoustic zone may utilize information about how many microphones are being used as input, where they are located relative to the acoustic zone, and the size and shape of the acoustic zone.

As discussed above in relation to FIG. 1, once sound produced from an acoustic zone has been identified, it may be provided to an automatic speech recognition (ASR) engine to calculate a measure of how likely it is that a wake-up word was uttered in the acoustic zone. In the example of FIG. 2, ASR engines 220a, 220b, 220c and 220d perform this function for acoustic zones 1, 2, 3 and 4, respectively.

In the example of FIG. 2, the calculated measures (e.g., confidence values) are provided to arbitration unit 230, which makes a determination of whether the wake-up word was uttered within one of the four acoustic zones, and if so, which acoustic zone most likely produced the utterance. This determination is provided to channel selection unit 240, which selects an acoustic signal output from one of the four spatial preprocessors 215a-215d and outputs this acoustic signal to the primary ASR unit 250.

As discussed above, once a wake-up word has been detected within an acoustic zone, it may be desirable to target sounds produced from that acoustic zone when performing subsequent speech recognition. In the example of FIG. 2, the arbitration unit 230 and the channel selection unit 240 work together to ensure that, once a wake-up word has been detected in an acoustic zone, subsequent sounds produced from that acoustic zone will be provided to the primary ASR 250, which performs speech recognition of sound produced from the spatial preprocessor selected by the channel selection unit. The primary ASR engine 250 may include an ASR language and acoustic model for recognizing a wide range of speech commands.

As a non-limiting example of this process, a user within acoustic zone 3 may utter the wake-up word "Hello Tetra," which is captured by the three microphones of illustrative system 200. The four spatial preprocessors 215a-215d determine which sounds were produced by each of the four acoustic zones; in this example, it would be expected that the sound identified by spatial preprocessor 215c corresponding to acoustic zone 3 would contain the majority of the sound of the user uttering the wake-up word captured by the microphones. When the four ASR engines 220a-220d analyze their respective acoustic signals, ASR engine 220c will most likely produce the highest confidence that the wake-up word "Hello Tetra" was uttered within its associated acoustic zone. Accordingly, arbitration unit 230 will instruct channel selection unit 240 to provide the output of spatial preprocessor 215c to the primary ASR engine 250 to recognize subsequent voice commands from the user.

According to some embodiments, system 200 may perform one or more actions as a result of subsequent speech recognition by ASR engine 250. For example, speech commands provided by a user after detection of a wake-up word may cause the system to take one or more actions in response to recognition of the speech commands. Such actions may include sending a signal to an external device to instruct the device to perform an action and/or may include sending a signal to a processing module of the system 200 to instruct the module to perform an action.

According to some embodiments, one or more actions taken in response to recognition of speech commands subsequent to detection of a wake-up word in an acoustic zone may be based upon which acoustic zone detected the wake-up word. For instance, when a wake-up word is detected in an acoustic zone in a living room and a speech command "turn on lamp" is subsequently recognized from the acoustic zone, the action taken by the system (e.g., to turn on a lamp in the living room) may be different from an action taken when the same wake-up word is detected in an acoustic zone in a different room and the same speech command "turn on lamp" is subsequently recognized from within that acoustic zone. In such cases, ASR engine 250 may include one or more grammars specific to particular acoustic zones so that responses can be tailored to the particular acoustic zone being targeted.

According to some embodiments, one or more actions taken in response to recognition of speech commands subsequent to detection of a wake-up word in an acoustic zone may be based upon an identification of a user who uttered the wake-up word. ASR engine 250 (or another component of unit 201) may perform biometrics of a voice that uttered the detected wake-up word to identify the speaker. The response of the system to subsequent voice commands may then be determined based on knowledge of the user's name, preferences, etc.

According to some embodiments, one or more actions taken in response to recognition of speech commands subsequent to detection of a wake-up word in an acoustic zone may be performed only once a security evaluation has been performed. The security evaluation may comprise determining whether a user who uttered a speech command is authorized to use the system and/or to perform a particular action requested by the command and/or may comprise determining whether an acoustic zone in which the wake-up word was detected is authorized to perform an action requested by the command. System 200 may be configured so that certain voice commands are only recognized when provided by particular users, or when provided using a password or PIN phrase, etc. In some embodiments, such security techniques may be used in conjunction with the above voice biometric approach to identify a user who is speaking and determining whether the user is authorized before performing a requested action. For example, an in-home system may only recognize voice commands from residents as voice commands that will lead to an action being performed to prohibit non-residents from giving the system commands. As another example, a system may only perform actions based on voice commands directed to a television when a user uttering the commands is both authorized to access the television and is located within an acoustic zone in which the television is located.

Figure 3:
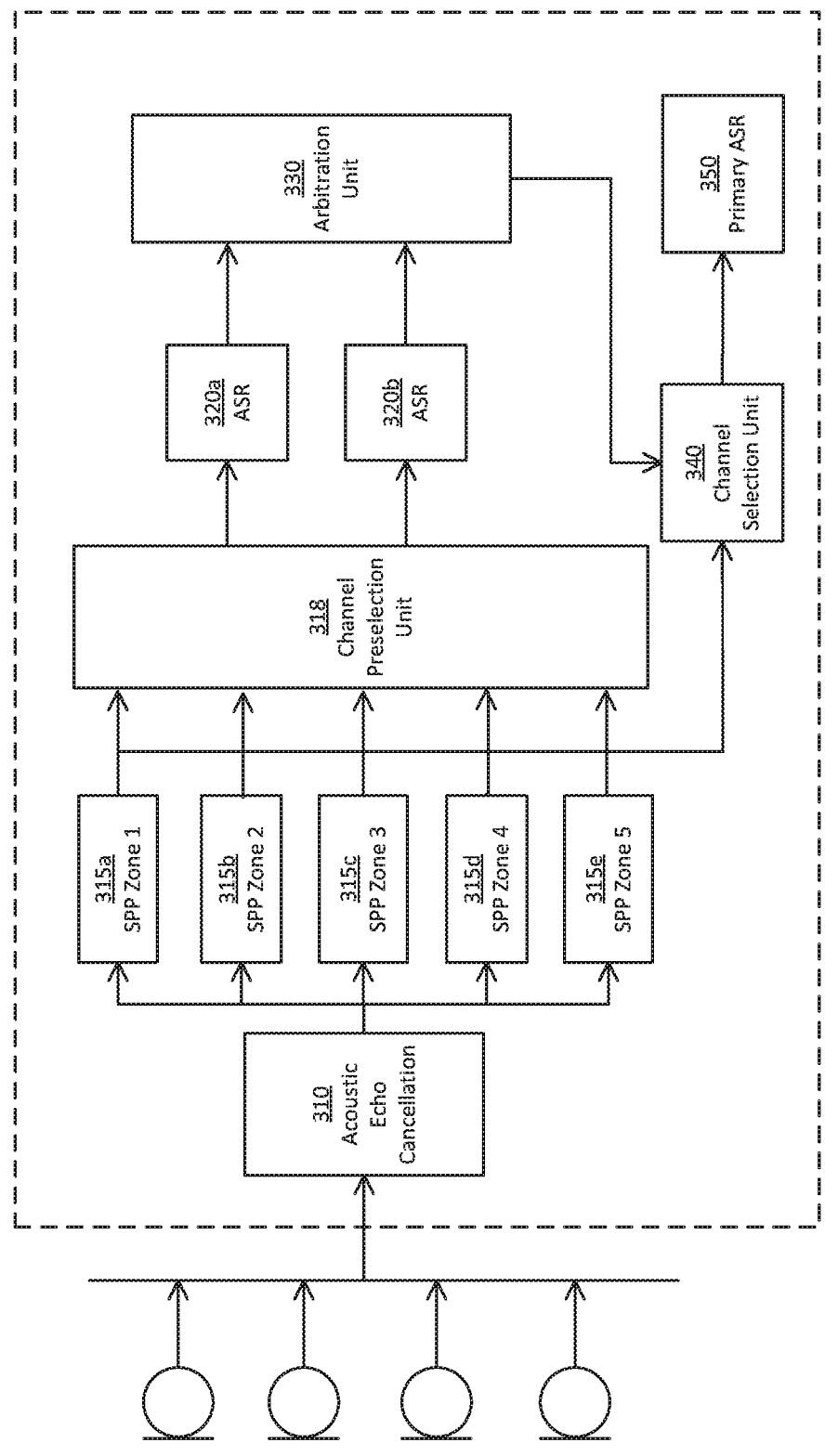
FIG. 3 is a block diagram of a wake-up word recognition system configured to perform preselection of acoustic signals, according to some embodiments.

FIG. 3 is a block diagram of a wake-up word recognition system configured to perform preselection of acoustic signals, according to some embodiments. In the example of FIG. 3, four microphones 305 are used as input to a wake-up word recognizer and speech recognition unit 301. Also in the example of FIG. 3, five acoustic zones are considered and analyzed to determine whether sounds captured by the microphones 305 include utterance of a wake-up word, and if so, in which of the five acoustic zones the utterance occurred. In some embodiments, wake-up word recognizer and speech recognition unit 301 may include a programmed general purpose computer, a configured custom circuit (e.g., an ASIC or FPGA), and/or combinations thereof, that may be operated to perform one or more of the below-described steps of wake-up word recognition.

In the example of FIG. 3, acoustic echo cancellation unit 310 and the spatial preprocessors (SPPs) 315a-315e function as the acoustic echo cancellation unit 210 and the spatial preprocessors 215a-215d, respectively, shown in FIG. 2 and described above.

FIG. 3 illustrates use of a channel preselection unit 318 to perform selection of a subset of the acoustic zones prior to analysis of sound identified by a spatial preprocessor as having been produced from respective acoustic zones.

In some embodiments, one or more sensors (not shown in FIG. 3) may provide input to the wake-up word recognizer and speech recognition unit 301, and such input may be used to exclude one or more acoustic zones from having produced utterance of a wake-up word without performing speech recognition on sound from those acoustic zones. This approach may reduce processing resources and/or time required to perform wake-up word detection, since fewer acoustic signals may need to be analyzed to perform wake-up word detection. Such sensors may include, but are not limited to, cameras, motion detectors, temperature sensors, pressure sensors, infrared/thermal sensors, noise sensors, sensors to detect interactions with one or more devices, or combinations thereof.

For instance, a system located in a motor vehicle may include multiple acoustic zones each associated with a particular seat in the vehicle. Pressure sensors located in the seats may provide signals to system 300 that indicate whether someone is sitting in each seat. This information may be input to system 300, leading to a determination that some acoustic zones should be excluded from wake-up word detection since the sensor signals indicate that nobody is sitting in the seats of those acoustic zones (and so nobody is within that acoustic zone to utter the wake-up word).

In some embodiments, selection of a subset of the acoustic zones by channel preselection unit 318 may be performed by examining features of the acoustic signals received from the SPPs 315a-315d. For instance, acoustic signals with low energy may be excluded by the channel preselection unit as being unlikely to comprise utterance of a wake-up word. Additionally, or alternatively, acoustic signals not containing sounds within pitch ranges of human speech may be excluded by the channel preselection unit as being unlikely to comprise utterance of a wake-up word. These and/or other analyses of the acoustic signals may be performed by channel preselection unit 318 in order to exclude acoustic signals.

In the example of FIG. 3, therefore, ASR engines 320a and 320b may analyze acoustic signals produced by any one of SPPs 315a-315e, depending on which acoustic zones are selected (not excluded) for analysis by channel preselection unit 318. Arbitration unit 330, channel selection unit 340 and primary ASR engine 350 function as arbitration unit 230, channel selection unit 240 and primary ASR engine 250 shown in FIG. 2 and discussed above.

Figure 4:
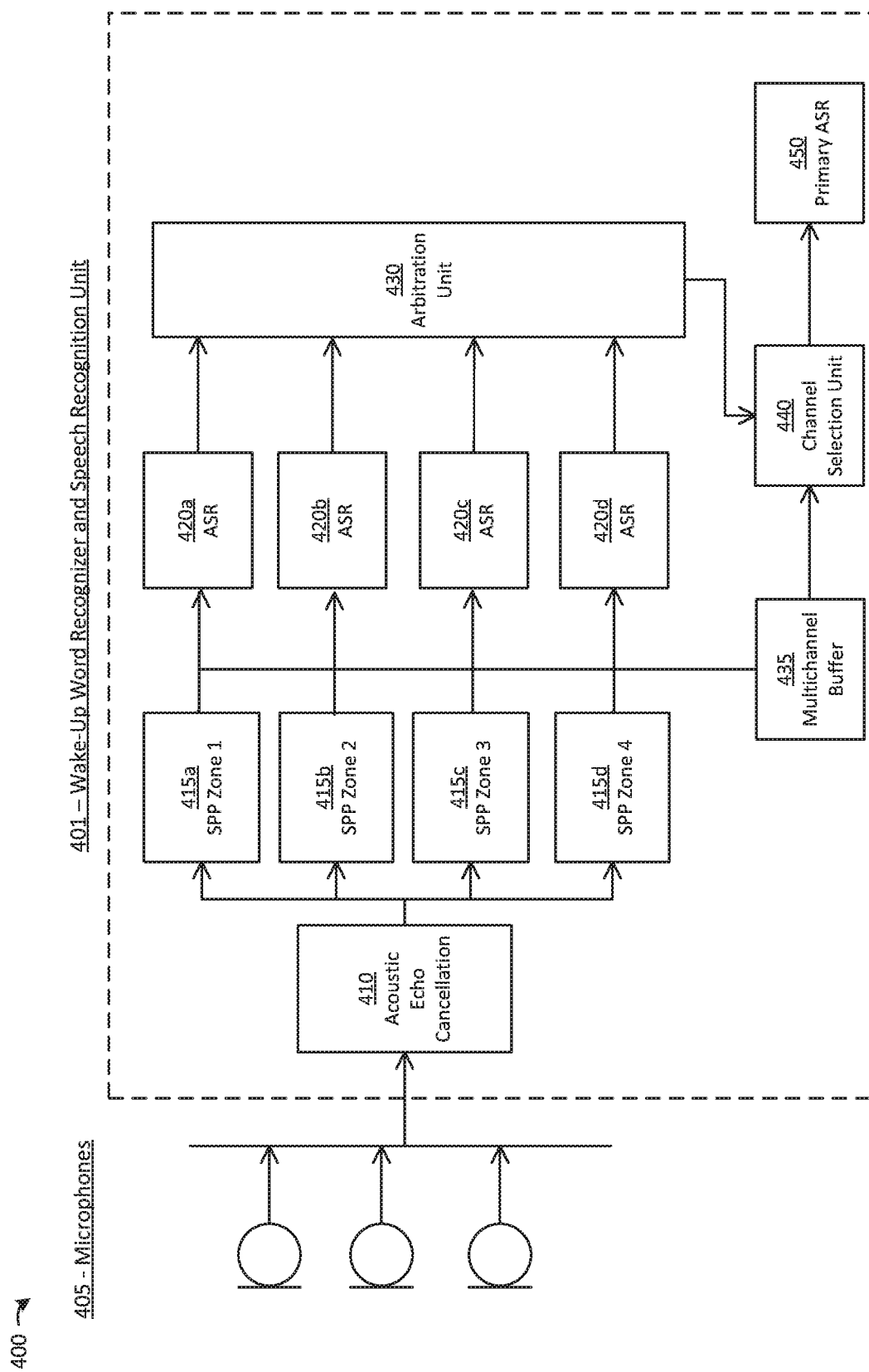
FIG. 4 is a block diagram of a wake-up word recognition system configured to buffer acoustic signals from a plurality of acoustic zones, according to some embodiments.

FIG. 4 is a block diagram of a wake-up word recognition system configured to buffer acoustic signals from a plurality of acoustic zones, according to some embodiments. In the example of FIG. 4, three microphones 405 are used as input to a wake-up word recognizer and speech recognition unit 401. Also in the example of FIG. 4, four acoustic zones are considered and analyzed to determine whether sounds captured by the microphones 405 include utterance of a wake-up word, and if so, in which of the four acoustic zones the utterance occurred. In some embodiments, wake-up word recognizer and speech recognition unit 401 may include a programmed general purpose computer, a configured custom circuit (e.g., an ASIC or FPGA), and/or combinations thereof, that may be operated to perform one or more of the below-described steps of wake-up word recognition.

In the example of FIG. 4, acoustic echo cancellation unit 410 and the spatial preprocessors (SPPs) 415a-415e function as the acoustic echo cancellation unit 210 and the spatial preprocessors 215a-215d, respectively, shown in FIG. 2 and described above. Arbitration unit 430, channel selection unit 440 and primary ASR engine 450 function as arbitration unit 230, channel selection unit 240 and primary ASR engine 250 shown in FIG. 2 and discussed above, except that channel selection unit 440 selects an acoustic signal from the multichannel buffer 435 instead of from the outputs of the SPPs 415a-415d, as described further below.

FIG. 4 illustrates use of a multichannel buffer 435 to buffer acoustic signals produced from SPPs 415a-415d while it is being determined whether a wake-up word was uttered within one of the acoustic zones. The use of such buffering may be provided to improve a user's experience when using the system, in the following manner.

When a user utters a wake-up word, the microphones 405 capture the sound and, as has been described above, a number of steps conclude with a determination that a wake-up word was uttered and an identification of which acoustic zone produced said utterance. However, the user may not be able to provide subsequent voice commands until these acts have completed and acoustic signals output from one of the SPP units 415a-415d are selected by the channel selection unit 440 (since the acts performed by units 410, 415a-415d, 420a-420d, 430 and 440 take a finite amount of time). It may therefore be beneficial to buffer the outputs of SPPs 415a-415d so that, once the acoustic zone that produced an utterance of a wake-up word is identified, the sounds produced from that acoustic zone during the period in which units 420a-420d, 430 and 440 were processing inputs and identifying the acoustic zone have already been captured and stored and may be provided to the primary ASR engine 450. This process thereby eliminates any need for a user to wait for a prompt or other signal from a system that the wake-up word has been recognized and can simply say the wake-up word and immediately (if desired) provide speech commands.

Figure 5:
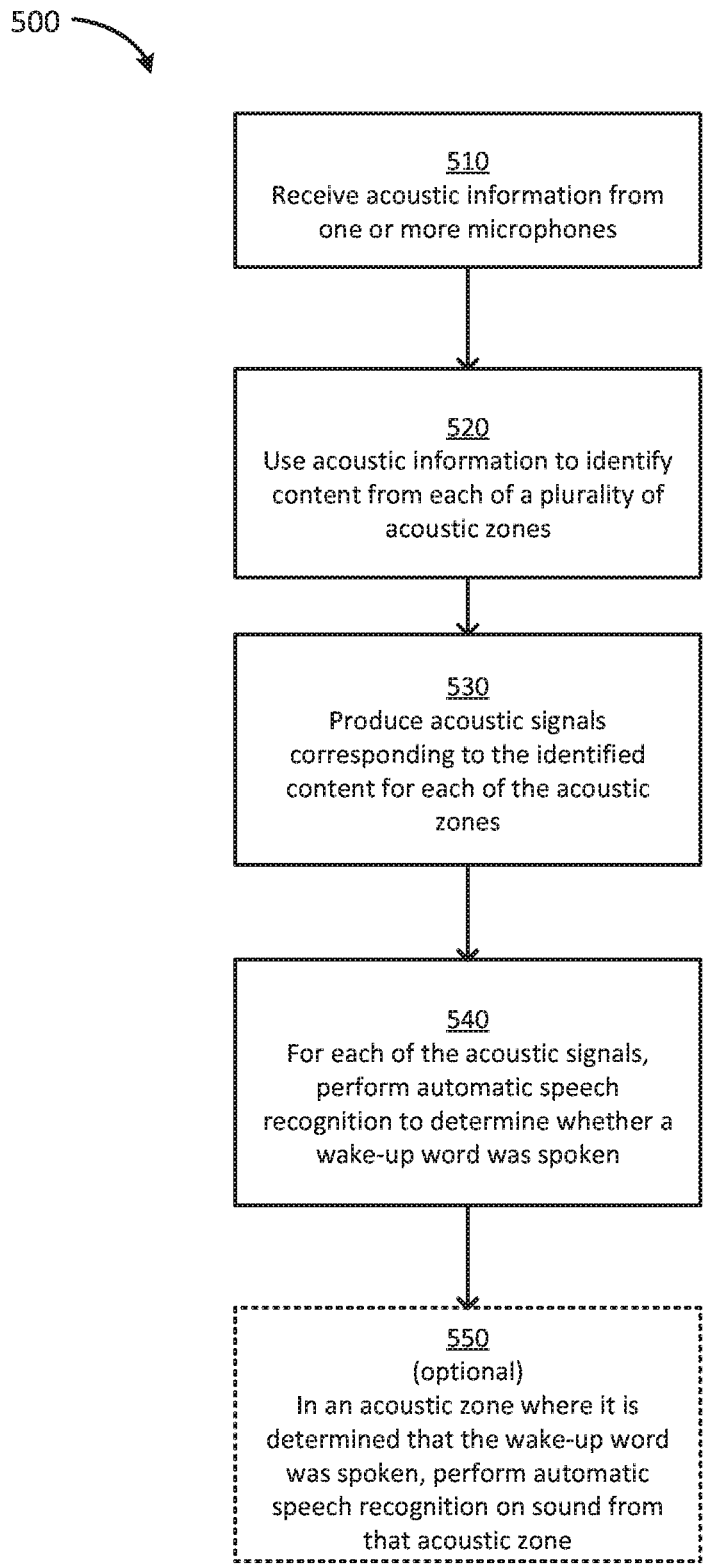
FIG. 5 is a flow chart of a method of performing wake-up word recognition, according to some embodiments.

FIG. 5 is a flow chart of a method of performing wake-up word recognition, according to some embodiments. Method 500 may be performed, for example, by any of systems 100, 200, 300 and/or 400 described above.

Method 500 begins in act 510 in which one or more microphones receive acoustic information. As discussed above, any suitable type and number of transducers configured to convert acoustic waves into electrical signals may be used to receive sound from an acoustic environment.

In act 520, the acoustic information received by the one or more microphones in act 510 is used to identify content within the acoustic information that was produced from within each of a plurality of acoustic zones. Act 520 utilizes information about the location of the one or more microphones relative to one another and relative to the acoustic zones in order to make such a determination. According to some embodiments, act 520 comprises spatial filtering (e.g., beamforming) of components of the acoustic information received to determine direction(s) to sound sources from by each microphone, which thereby allows determination of locations of the sound sources by utilizing the relative position of the microphones.

Once sound content has been identified as being produced from a particular location, the location may be examined to determine whether it is within a particular predefined acoustic zone. Sounds identified as having been produced from a given acoustic zone may thereby be combined to produce an acoustic signal representing the sound produced from that zone. In act 530, such acoustic signals are produced for each of the acoustic zones.

In act 540, automatic speech recognition is performed upon the acoustic signals produced in act 530 to identify whether a wake-up word was spoken. As discussed above, the wake-up word may be a single word or a phrase, and act 540 may search for one or more wake-up words in the acoustic signals produced in act 530.

When it is determined that at least one of the acoustic signals included utterance of a wake-up word, act 550 may optionally then perform additional speech recognition on sound produced from the acoustic zone associated with the acoustic signal.

Figure 6:
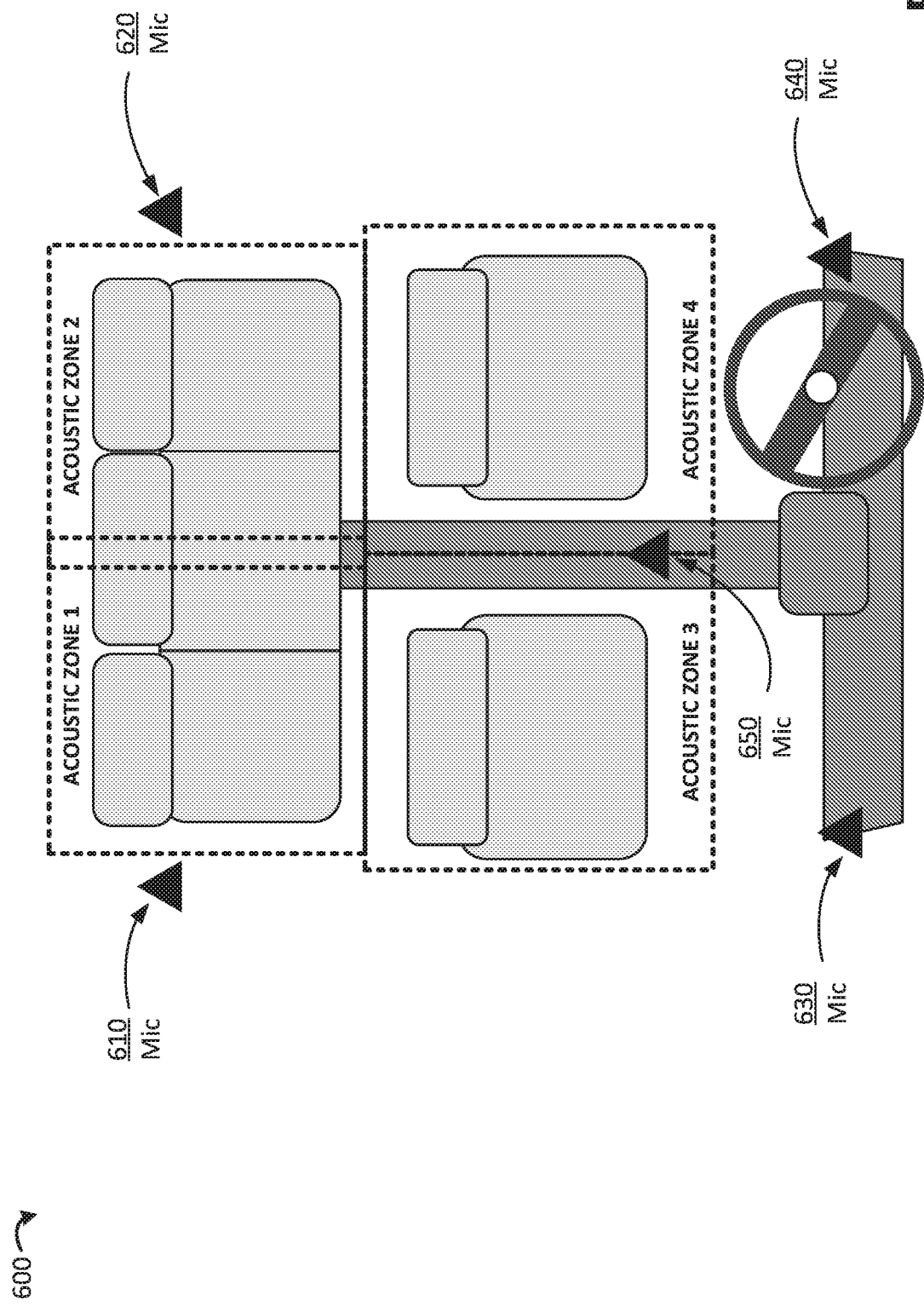
FIG. 6 illustrates an interior of a motor vehicle in which wake-up word recognition techniques may be practiced, according to some embodiments.

FIG. 6 illustrates an interior of a motor vehicle in which wake-up word recognition techniques may be practiced, according to some embodiments. System 600 illustrates a space that has been configured to include four acoustic zones and also includes five microphones (depicted as black triangles). The vehicle depicted in FIG. 6 could, for example, include an in-vehicle voice recognition system that may be accessed to initiate phone calls, send text messages, operate a stereo system, etc. As shown in the figure, acoustic zones 1 and 2 spatially overlap.

Each of the microphones 610, 620, 630, 640 and 650 may capture sound from within the vehicle (and will typically capture sound from outside as well, especially if the vehicle is in motion). As such, a passenger speaking in a given acoustic zone will generally produce sound that will be captured by each of the microphones, though the amplitude of the passenger's speech and the times at which the speech sounds arrive at each microphone will be different. As described above, these differences, coupled with the relative positions of microphones 610, 620, 630, 640 and 650, allow a determination of which of the four acoustic zones the speaking passenger is located.

Also as described above, a wake-up word recognition system may be configured to perform voice biometrics in order to identify the utterer of a wake-up word and to tailor subsequent responses to voice commands to that user. As a non-limiting example, four passengers may be sitting in vehicle 600 and the driver in acoustic zone 4 may utter a wake-up word "Hello Tetra." In response, the system may identify both that the utterance of the wake-up word was produced in acoustic zone 4 and may further identify the speaker by matching the speaker's voice to known biometric information about that user's voice characteristics. In some cases, the system may respond with an audible sound and/or synthesized speech to indicate that the wake-up word was recognized, which may also be tailored to the user. For example, in response to the wake-up word "Hello Tetra," the system may respond with "Hello, Julien."

The driver may then provide speech commands, which again may have a response tailored to the identification of the user. For example, the driver may say "Play my driving playlist," which initiates playback through the vehicle stereo system of a previously stored music playlist associated with the identified user.

Subsequently, the passengers in the front seats may be conducting a conversation while a passenger in the rear seat in acoustic zone 2 may wish to provide a voice command. Even though there are other speakers in the vehicle, independently performing speech recognition on sounds produced from each acoustic zone as described above may allow recognition of the wake-up word by the passenger in acoustic zone 2. The passenger in acoustic zone 2 may thereafter provide voice commands that will also be recognized since the system may target sounds produced within the acoustic zone in which the wake-up word was recognized, as described above.

Figure 7:
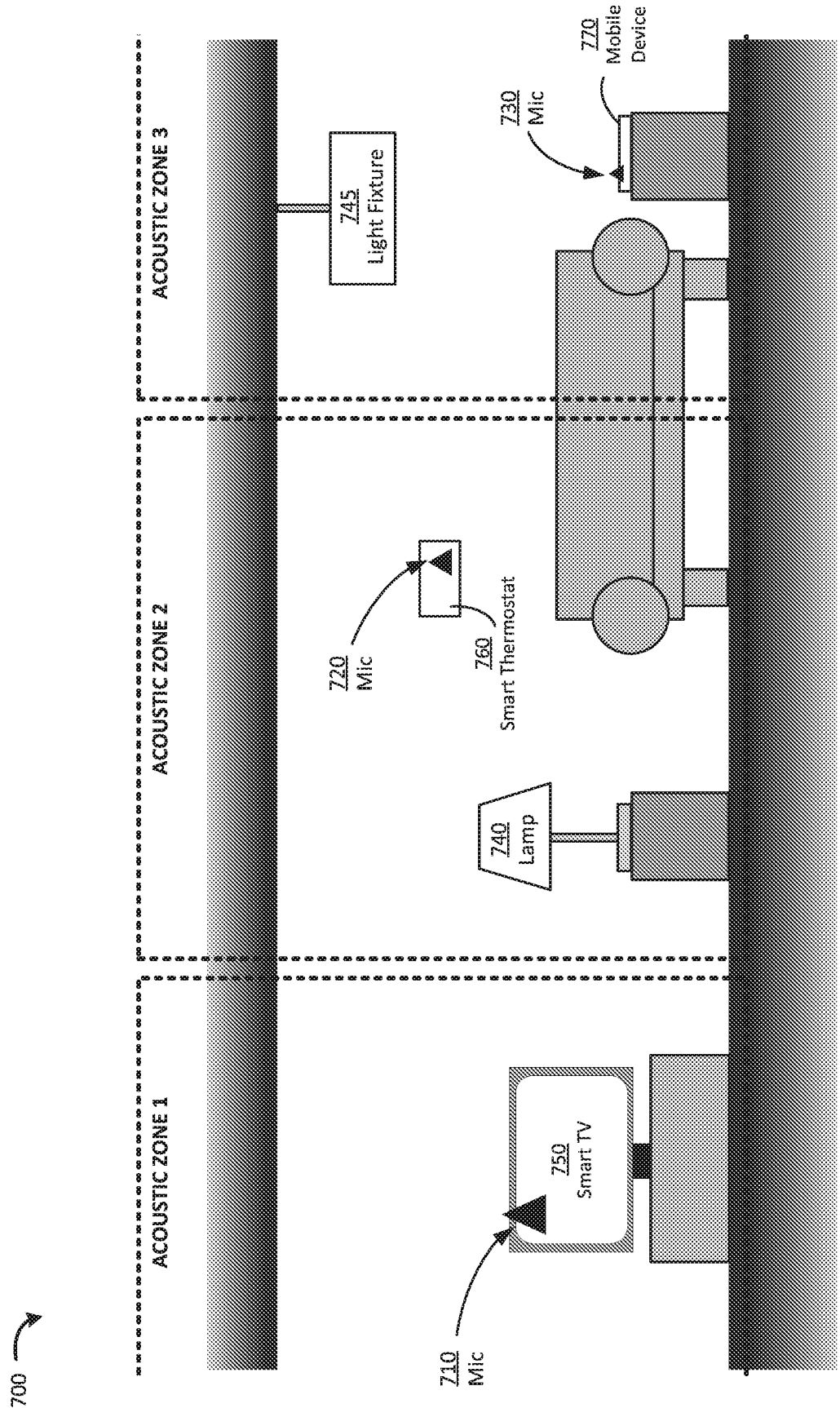
FIG. 7 illustrates an interior of a home in which wake-up word recognition techniques may be practiced, according to some embodiments.

FIG. 7 illustrates an interior of a home in which wake-up word recognition techniques may be practiced, according to some embodiments. System 700 illustrates a space that has been configured to include at least three acoustic zones and also includes three microphones (depicted as black triangles). In the example of FIG. 7, microphone 710 is located within a smart TV 750, microphone 720 is located within smart thermostat 760, and microphone 730 is located within a mobile device 770.

A user speaking in any part of the home depicted in FIG. 7 may cause sound of the speech to be captured by any of the microphones 710, 720 and 730. As discussed above, a wake-up word may be recognized by identifying acoustic signals produced from each of the three acoustic zones and by performing speech recognition of the wake-up word for each of the identified acoustic signals.

As discussed above, a system's response to voice commands after recognition of a wake-up word may depend on which acoustic zone was identified as having produced the wake-up word. As one such example, system 700 may be so configured to produce different responses to the command "turn on the light," depending on whether the command is spoken in acoustic zone 1, 2 or 3. When the command is produced from within acoustic zone 2, the lamp 740 may be turned on as a result of recognizing the command. When the command is produced from within acoustic zone 3, the light fixture 745 may be turned on as a result of recognizing the command. When the command is produced from within acoustic zone 1, since no light is present (at least in the illustrative example of FIG. 7), the system may either not perform an action or may provide audible and/or visual feedback indicating that the desired command cannot be executed.

Figure 8:
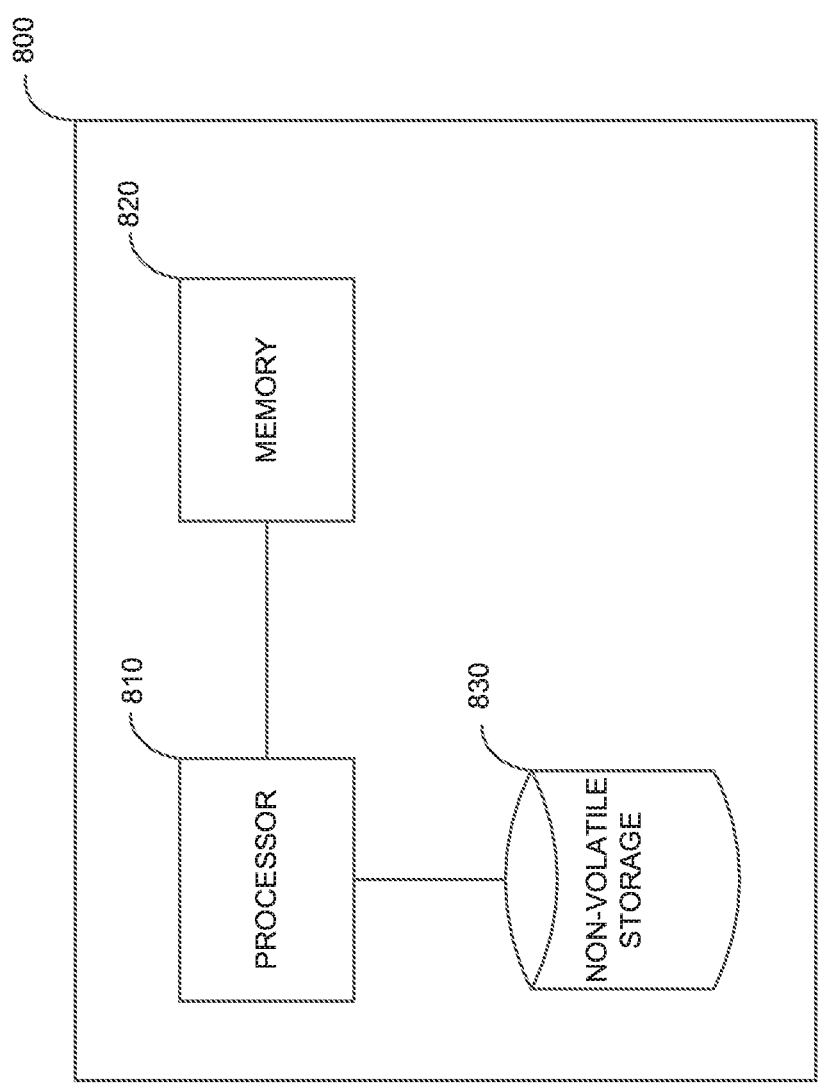
FIG. 8 illustrates an example of a computing system environment on which aspects of the invention may be implemented.

An illustrative implementation of a computer system 800 that may be used to implement wake-up word recognition as described herein is shown in FIG. 8. The computer system 800 may include one or more processors 810 and one or more non-transitory computer-readable storage media or storage devices (e.g., memory 820 and one or more non-volatile storage media 830). The processor 810 may control writing data to and reading data from the memory 820 and the non-volatile storage device 830 in any suitable manner, as the aspects of the invention described herein are not limited in this respect. To perform the functionality and/or techniques described herein, the processor 810 may execute one or more instructions stored in one or more computer-readable storage media (e.g., the memory 820, storage media, etc.), which may serve as non-transitory computer-readable storage media storing instructions for execution by the processor 810.

In connection with techniques for wake-up word recognition as described herein, code used to, for example, perform speech recognition, processing acoustic signals, perform spatial filtering, identify an acoustic zone that produced a wake-up word, etc. may be stored on one or more computer-readable storage media of computer system 800. Processor 810 may execute any such code to provide any techniques for wake-up word recognition as described herein. Any other software, programs or instructions described herein may also be stored and executed by computer system 800. It will be appreciated that computer code may be applied to any aspects of methods and techniques described herein. For example, computer code may be applied to speech recognition techniques.

Various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) or a computer readable storage device encoded with one or more programs that, when executed on one or more computers or other processors, implement some of the various embodiments of the present invention. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of one or more embodiments described herein need not reside on a single computer or processor, but may be distributed in a modular fashion among different computers or processors to implement various aspects of the present invention.

Techniques utilized herein may be utilized with any type of automatic speech recognition techniques such as, but not limited to, speaker independent or speaker dependent models, deep neural networks, hidden Markov models (HMMs), or combinations thereof. Also, it will be appreciated that while particular illustrative acoustic zones have been depicted and described herein, such acoustic zones may generally have any suitable size and shape and may overlap or be distinct from other acoustic zones so defined in a suitable system.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Also, various inventive concepts may be embodied as one or more methods, of which examples have been provided. The acts performed as part of a method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A system for detecting a designated wake-up word in a physical space having a plurality of acoustic zones, the system comprising:
at least one processor configured to:
receive a first acoustic signal comprising acoustic information from a plurality of microphones comprising a first microphone in a first acoustic zone of the plurality of acoustic zones and a second microphone in a second acoustic zone of the plurality of acoustic zones;

process the first acoustic signal to identify content of the first acoustic signal originating from each of the plurality of acoustic zones;
generate, based on the first acoustic signal, a plurality of second acoustic signals, each of the plurality of second acoustic signals corresponding to one of the first acoustic zone and the second acoustic zone and comprising content corresponding to the content identified as originating from the one acoustic zone;
separately perform automatic speech recognition on one or more of the plurality of second acoustic signals to determine whether the designated wake-up word was spoken;
select, in response to the designated wake-up word being spoken, the first acoustic zone of the plurality of acoustic zones based on, for each of one or more of the plurality of second acoustic signals, whether the designated wake-up word was spoken in the first acoustic zone; and
perform additional automatic speech recognition of sound originating from the first acoustic zone to target the first acoustic zone for subsequent automatic speech recognition;
identify one or more spoken commands within the sound originating from the first acoustic zone; and
determine whether that the first acoustic zone is authorized to perform the one or more spoken commands.

2. The system of claim 1, wherein processing the first acoustic signal to identify the content of the first acoustic signal originating from each of the plurality of acoustic zones comprises performing spatial filtering for at least one of the plurality of acoustic zones.

3. The system of claim 1, wherein the at least one processor is configured to receive a first acoustic signal comprising acoustic information from a plurality of microphones comprising a first microphone in a first acoustic zone of the plurality of acoustic zones and a second microphone in a second acoustic zone of the plurality of acoustic zones.

4. The system of claim 3, wherein the at least one processor is configured to receive a first acoustic signal comprising acoustic information from a plurality of microphones comprising a third microphone not located within any of the plurality of acoustic zones.

5. The system of claim 1, wherein performing automatic speech recognition on the one or more of the plurality of second acoustic signals comprises using a different acoustic model for each of the plurality of second acoustic signals, wherein the acoustic model for each of the plurality of second acoustic signals includes a speech recognition model for the acoustic environment of the associated acoustic zone.

6. The system of claim 1, wherein performing automatic speech recognition on the one or more of the plurality of second acoustic signals comprises using a language model limited to the designated wake-up word.

7. The system of claim 1, wherein the at least one processor is configured to receive a first acoustic signal comprising acoustic information from a plurality of microphones comprising at least one microphone located within a mobile device.

8. The system of claim 1, wherein a number of the second acoustic signals is equal to or less than a number of the acoustic zones.

9. The system of claim 8, wherein the number of the second acoustic signals is less than the number of acoustic zones, and wherein the at least one processor is further configured to:
provide a plurality of third acoustic signals corresponding to the content identified as originating from a respective one of the plurality of acoustic zones, wherein a number of third acoustic signals is equal to the number of acoustic zones;
select the plurality of second acoustic signals as a subset of the plurality of third acoustic signals.

10. The system of claim 9, wherein selecting the plurality of second acoustic signals as a subset of the plurality of third acoustic signals is based at least in part upon data from at least one hardware sensor, wherein the hardware sensor is an occupant detection sensor to detect whether an occupant is located within one of the plurality of acoustic zones.

11. The system of claim 1, wherein the at least one processor is configured to determine, prior to performing additional automatic speech recognition of sound originating from the first acoustic zone, that a user who spoke the designated wake-up word is authorized to access the system.

12. A system for detecting a designated wake-up word in a physical space having a plurality of acoustic zones, the system comprising:
at least one processor configured to:
receive a first acoustic signal comprising acoustic information from a plurality of microphones comprising a first microphone in a first acoustic zone of the plurality of acoustic zones and a second microphone in a second acoustic zone of the plurality of acoustic zones;
process the first acoustic signal to identify content of the first acoustic signal originating from each of the plurality of acoustic zones;
generate, based on the first acoustic signal, a plurality of second acoustic signals, each of the plurality of second acoustic signals corresponding to one of the first acoustic zone and the second acoustic zone and comprising content corresponding to the content identified as originating from the one acoustic zone, wherein the number of the second acoustic signals is less than the number of the acoustic zones;
separately perform automatic speech recognition on one or more of the plurality of second acoustic signals to determine whether the designated wake-up word was spoken;
select, in response to the designated wake-up word being spoken, the first acoustic zone of the plurality of acoustic zones based on, for each of one or more of the plurality of second acoustic signals, whether the designated wake-up word was spoken in the first acoustic zone;
perform additional automatic speech recognition of sound originating from the first acoustic zone to target the first acoustic zone for subsequent automatic speech recognition;
provide a plurality of third acoustic signals corresponding to the content identified as originating from a respective one of the plurality of acoustic zones, wherein a number of third acoustic signals is equal to the number of acoustic zones; and
select the plurality of second acoustic signals as a subset of the plurality of third acoustic signals based at least in part upon data from at least one hardware sensor, wherein the hardware sensor is an occupant detection sensor to detect whether an occupant is located within one of the plurality of acoustic zones.

13. The system of claim 1, wherein the at least one processor is configured to send a signal to at least one external device based at least in part on a result of performing additional automatic speech recognition of sound originating from the first acoustic zone.

14. The system of claim 13, wherein the signal sent to the at least one external device is based at least in part on information associated with the first acoustic zone.

15. The system of claim 1, wherein the at least one processor is configured to buffer the plurality of second acoustic signals, and wherein performing additional automatic speech recognition of sound originating from the first acoustic signal utilizes one of the buffered second acoustic signals as input.

16. The system of claim 1, wherein at least some of the plurality of acoustic zones spatially overlap.

17. A method for detecting a designated wake-up word in a physical space having a plurality of acoustic zones, the method comprising:
receive a first acoustic signal comprising acoustic information from a plurality of microphones comprising a first microphone in a first acoustic zone of the plurality of acoustic zones and a second microphone in a second acoustic zone of the plurality of acoustic zones;
processing the first acoustic signal to identify content of the first acoustic signal originating from each of the plurality of acoustic zones;
generating, based on the first acoustic signal, a plurality of second acoustic signals, each of the plurality of second acoustic signals corresponding to one of the first and second acoustic zones and comprising content corresponding to the content identified as originating from the one acoustic zone;
separately performing automatic speech recognition on one or more of the plurality of second acoustic signals including using a different acoustic model for each of the plurality of second acoustic signals to determine whether the designated wake-up word was spoken, wherein the acoustic model for each of the plurality of second acoustic signals includes a speech recognition model for the acoustic environment of an associated acoustic zone;
identify one or more spoken commands within the sound originating from the first acoustic zone; and
determine whether that the first acoustic zone is authorized to perform the one or more spoken commands.

18. The method of claim 17, comprising:
selecting a first acoustic zone of the plurality of acoustic zones based on, for each of the one or more of the plurality of second acoustic signals, whether the designated wake-up word was spoken in the respective acoustic zone; and
performing additional automatic speech recognition of sound originating from the first acoustic zone.

19. The method of claim 17, wherein processing the first acoustic signal to identify the content of the first acoustic signal originating from each of the plurality of acoustic zones comprises performing spatial filtering for at least one of the plurality of acoustic zones.

20. The system of claim 12 wherein the at least one processor is configured to, after performing additional automatic speech recognition of sound originating from the first acoustic zone:
identify one or more spoken commands within the sound originating from the first acoustic zone; and
determine whether that the first acoustic zone is authorized to perform the one or more spoken commands.

* * * * *